United States Patent [19]

Yamamoto

[11] Patent Number: 4,848,294
[45] Date of Patent: Jul. 18, 1989

[54] CARBURETOR HEATING DEVICE FOR SMALL SNOWMOBILE

[75] Inventor: Masanobu Yamamoto, Iwata, Japan

[73] Assignee: Yamaha Hatsudoki Kabushiki Kaisha, Iwata, Japan

[21] Appl. No.: 158,216

[22] Filed: Feb. 19, 1988

[30] Foreign Application Priority Data

Feb. 20, 1987 [JP] Japan ................................ 62-35777

[51] Int. Cl.⁴ .............................................. F01P 1/02
[52] U.S. Cl. ............................... 123/198 E; 123/41.7; 123/556
[58] Field of Search ........... 123/195 A, 198 E, 195 C, 123/198 R, 41.6, 41.7, 41.56, 41.58, 41.04, 41.48, 41.51, 41.66, 556; 181/229

[56] References Cited

U.S. PATENT DOCUMENTS

| | | | |
|---|---|---|---|
| 2,571,828 | 10/1951 | Brezek | 123/41.7 |
| 4,188,924 | 2/1980 | Kirchweger et al. | 123/198 E |
| 4,235,298 | 11/1980 | Sackett et al. | 123/198 E |
| 4,327,680 | 5/1982 | Dauwahder | 123/198 E |
| 4,432,309 | 2/1984 | Hutchison et al. | 123/41.7 |
| 4,453,524 | 6/1984 | Lee | 123/556 |
| 4,455,971 | 6/1984 | Kirchweger et al. | 123/41.7 |
| 4,459,944 | 7/1984 | Kirchweger et al. | 123/41.7 |
| 4,535,746 | 8/1985 | Otani et al. | 123/556 |
| 4,592,316 | 6/1986 | Shiratsuchi et al. | 123/198 E |
| 4,632,070 | 12/1986 | Onda et al. | 123/41.7 |

FOREIGN PATENT DOCUMENTS 4365607  12/1982  Japan ................... 123/556

Primary Examiner—Raymond A. Nelli
Attorney, Agent, or Firm—Ernest A. Beutler

[57] ABSTRACT

A carburetor heating device for a small snowmobile having a belt type transmission. The transmission is provided with a cooling system for circulating cooling air across the belt and the heated cooling air is then discharged in proximity to the engine induction system for heating it.

12 Claims, 3 Drawing Sheets

CARBURETOR HEATING DEVICE FOR SMALL SNOWMOBILE

BACKGROUND OF THE INVENTION

This invention relates to a carburetor heating system for a small snowmobile and more particularly to an improved construction for heating the induction system of a small snowmobile while permitting a lightweight construction.

Snowmobiles are highly popular vehicles for both recreational and work purposes in climates where there is a large amount of snow and cold weather. As the design of snowmobiles has progressed, they have tended to become larger, more complicated and heavier. Although such heavier larger snowmobiles have many advantages, there is a market for a small lightweight snowmobile. In accordance with the invention, it is proposed to provide such a lightweight snowmobile that is powered by the type of power unit normally used for a small two wheel vehicle such as a motor scooter or the like. Such drive arrangements are very compact and lend themselves for application to lightweight snowmobiles.

However, in conjunction with such a lightweight snowmobile, the positioning of the motor scooter type of drive arrangement places the engine and its induction system in proximity to the snow and in a generally unsheltered fashion, if a lightweight construction is to be obtained. As a result, there is a danger of icing in the induction system and the resultant adverse running conditions.

It is, therefore, a principal object of this invention to provide an improved induction system heating device for a small snowmobile.

It is a further object of this invention to provide an induction system heating device that permits the use of a motor scooter type of drive arrangement in a small snowmobile.

It is yet a further object of this invention to provide an arrangement wherein the cooling arrangement for the transmission of a small snowmobile is employed for heating its induction system.

SUMMARY OF THE INVENTION

This invention is adapted to be embodied in an arrangement for heating the induction system of a vehicle comprised of an internal combustion engine having an induction system and transmission means driven by the engine for driving a component of the vehicle. In accordance with the invention, cooling means are provided for cooling the transmission means and means are incorporated for transferring at least a portion of the heat extracted from the transmission means to the induction system for heating the intake charge of the engine.

DETAILED DESCRIPTION OF THE PREFERRED EMBODIMENT OF THE INVENTION

Figure 1:
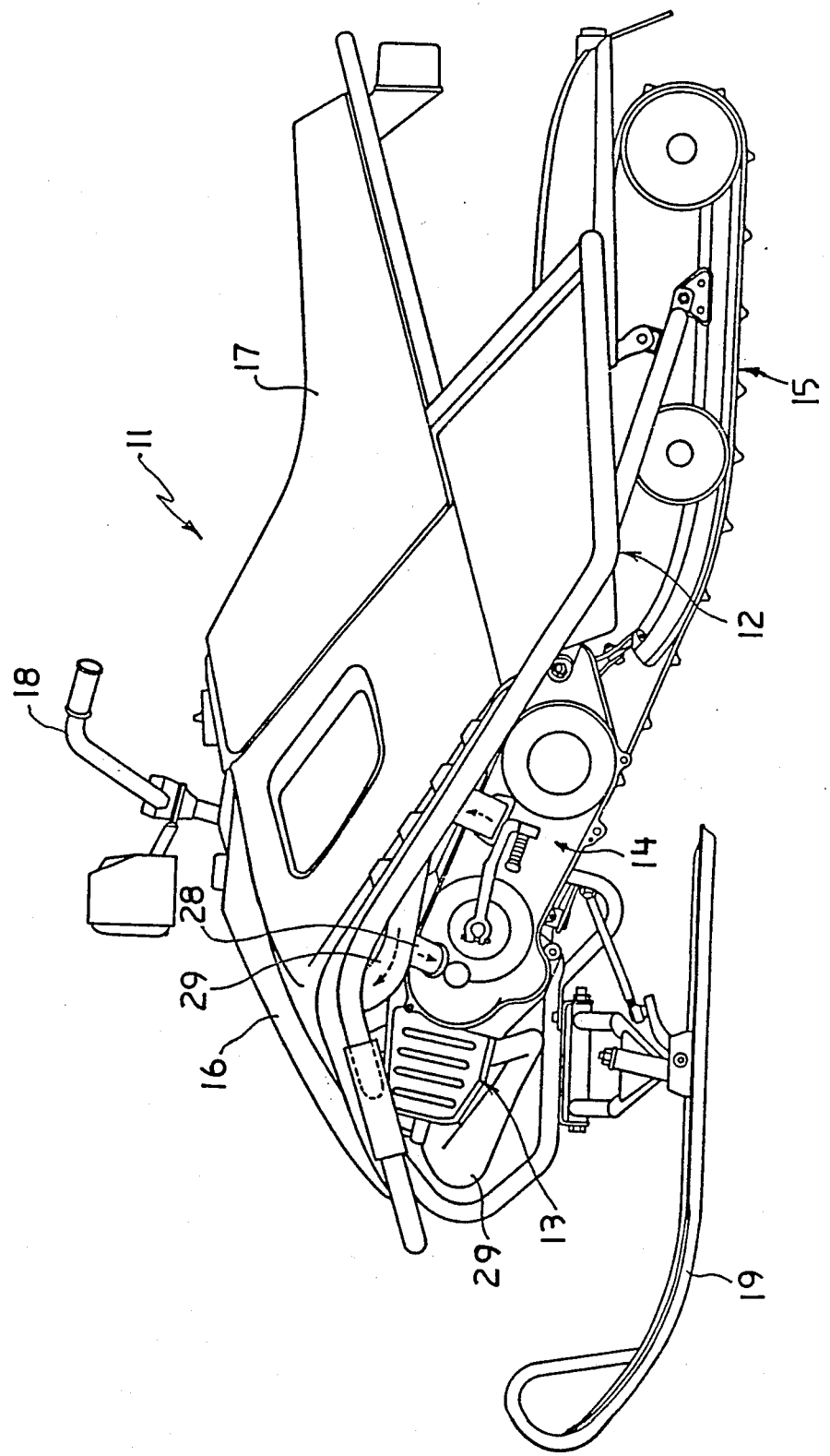
FIG. 1 is a side elevational view of a small snowmobile constructed in accordance with an embodiment of the invention.

Referring first primarily to FIG. 1, a small snowmobile constructed in accordance with an embodiment of the invention is identified generally by the reference numeral 11. The small snowmobile 11 is designed to be operated primarily by a single rider and is of a lightweight construction. The snowmobile 11 includes a frame assembly 12 which may be of any known type but which preferably is formed of an open tubular construction for lightweight and high strength. A power unit, indicated generally by the reference numeral 13 is positioned forwardly in the frame 12 for powering the snowmobile. The power unit 13 is preferably of the type employed in a motor scooter type of vehicle and is comprised of a single cylinder internal combustion engine that drives a variable speed belt type transmission indicated generally by the reference numeral 14. The belt transmission 14, in turn, drives a driving belt 15 for powering the snowmobile 11.

A body 16 is carried by the frame assembly 12 and overlies the power unit 13 and transmission 14. The body 16 is generally of a cup like configuration having a downwardly facing opening for ease of insertion onto the frame 12 over the power unit 13. As a result, the lower side of the power unit 13 is generally exposed to the elements. A seat 17 is supported rearwardly of the frame 12 relative to the body 16 and is adapted to accommodate a single rider. A handlebar assembly 18 is carried by the frame 12 forwardly of the seat 17 for steering a pair of dirigibly supported front skis 19 in a known manner.

Figure 2:
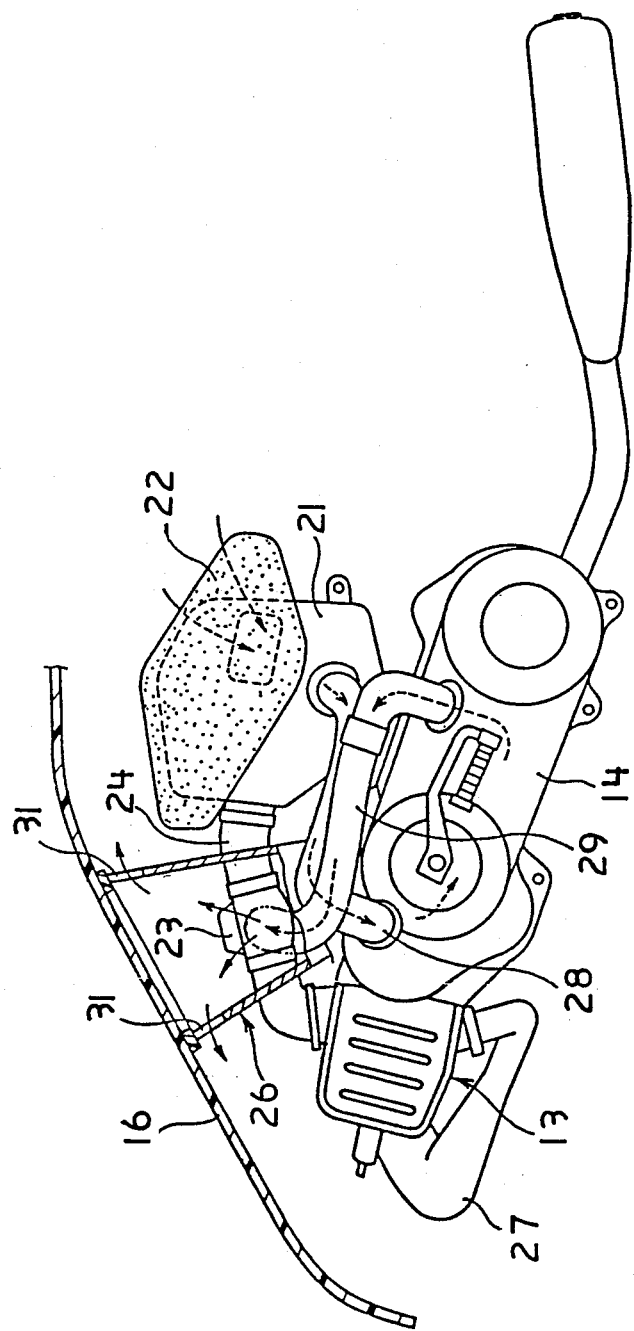
FIG. 2 is a side elevational view of the snowmobile, with portions broken away and removed to show the driving arrangement and the heat transfer system between the transmission and the induction system.
Figure 3:
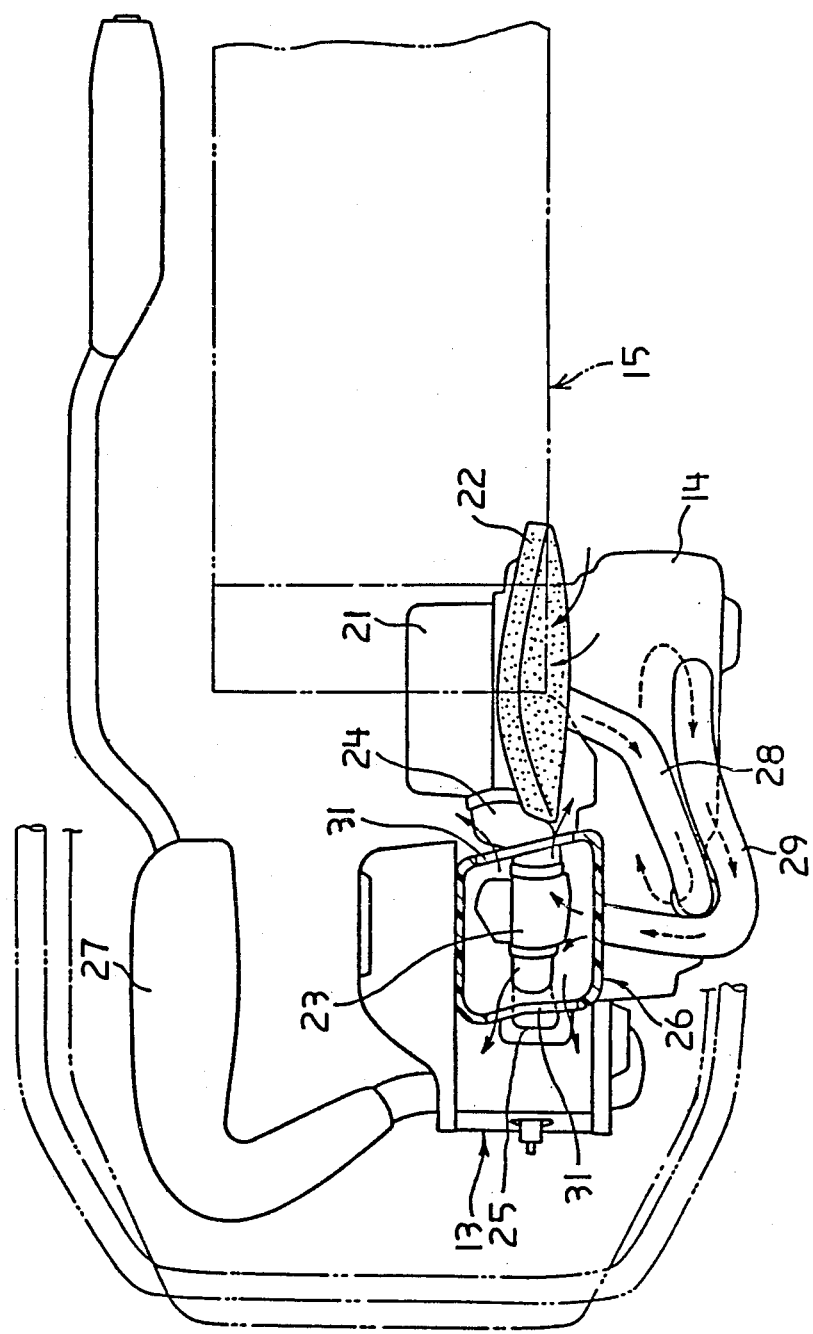
FIG. 3 is a top plan view showing the components illustrated in FIG. 2.

Referring now primarily to FIGS. 2 and 3, the power unit 13 is provided with an induction system that is comprised of an air box or plenum chamber 21 that is positioned over the transmission 14 within the body 16. The air box 21 draws atmospheric air from externally of the body 16 through an air filter element 22. Air is delivered from the air box 21 to a carburetor 23 through a conduit 24. The carburetor 23, in turn, discharges a fuel air mixture into the cylinder of the engine or power unit 13 through an intake manifold 25 in a known manner. The carburetor 23 is enclosed within an air box 26 which is appropriately fixed to the power unit 13 in a manner as described in pending application Ser. No. 163,389 entitled Frame and Body Construction for Small Snowmobile, filed 3/2/88 in the name of Toshihiro Yasui et al which application is assigned to the assignee of this application.

The engine or power unit 13 is also provided with an exhaust system, indicated generally by the reference numeral 27 for discharging the exhaust gases from the cylinder of the engine to the atmosphere. The exhaust system 27 includes a muffler and tail pipe of any suitable configuration.

As has been noted, the transmission 14 is of the variable belt type and includes a driving pulley that is drivingly connected to the output shaft of the power unit 13 and which drives a driven pulley through a belt mechanism. Since this type of mechanism is well known, it has not been illustrated. The driving and driven pulleys are, however, of the variable sheave type and provide a varying speed ratio between the input and output shafts. The driven pulley is coupled to the drive belt 15 for driving it in a known manner.

As is well known, such variable speed transmissions generate a fairly substantial amount of heat during their operation and in order to ensure long belt life, it is desirable to cool the transmission. In the illustrated embodiment, this is accomplished by means of an air cooling system that includes an air inlet pipe 28 through which filtered air may be drawn from the air box 21 and delivered to the interior of the transmission casing 14 in proximity to a fan (not shown) that is driven by the driving pulley. The air is then circulated through the transmission casing 14 and is discharged through a discharge conduit 29.

It should be readily apparent, the application of the snowmobile 11 causes it to be operated in conditions having low temperatures. The exposure of the power unit 13 and specifically that of the carburetor 23 can cause cooling in the induction system which might cause icing conditions. However, in accordance with the invention, the heated air extracted from the transmission 14 is delivered to the carburetor 23 through the conduit 29 which discharges into the box 26. The box 26 is provided with atmospheric discharge openings 31 so that the air which has heated the induction system and specifically the carburetor 23 may be discharged so as to ensure a continuous air flow.

From the foregoing description it should be readily apparent that an effective system has been provided for not only cooling the transmission of the snowmobile but also for heating its induction system to reduce the likelihood of icing conditions.

It is to be understood that the foregoing description is that of a preferred embodiment of the invention and that various changes and modifications may be made without departing from the spirit and scope of the invention, as defined by the appended claims.

I claim:

1. An arrangement for heating the induction system of a vehicle comprised of an internal combustion engine having an induction system, a heating jacket surrounding only a portion of said induction system, transmission means driven by said engine for driving a component of the vehicle, cooling means for cooling said transmission means, and means for transferring at least a portion of the heat extracted form said transmission means by said cooling means to said induction system heating jacket for heating the intake charge of the engine.

2. An arrangement as set forth in claim 1 wherein the transmission means drives the vehicle.

3. An arrangement as set forth in claim 2 wherein the transmission means comprises a belt type transmission.

4. An arrangement for heating the induction system of a vehicle comprised of an internal combustion engine having an induction system, a belt type transmission means driven by said engine for driving said vehicle, cooling means for cooling said transmission means comprising a cooling shroud surrounding said transmission belt and fan means driven by the transmission for cooling the transmission, and means for transferring at least a portion of the heat extracted from said transmission means by said cooling means to said induction system for heating the intake charge of the engine.

5. An arrangement as set forth in claim 4 wherein the means for transferring a portion of the heat extracted from the transmission means to the induction system comprises means for conveying the cooling air discharged from the cooling shroud into proximity with the induction system.

6. An arrangement as set forth in claim 3 wherein the cooling means comprises a cooling shroud surrounding the belt and fan means driven by the transmission for cooling the transmission.

7. An arrangement as set forth in claim 6 wherein the means for transferring a portion of the heat extracted from the transmission means to the induction system comprises means for conveying the cooling air discharged from the cooling shroud into the induction system heating jacket.

8. An arrangement as set forth in claim 1 wherein the vehicle comprises a snowmobile having a belt drive.

9. An arrangement as set forth in claim 8 wherein the transmission means drives the vehicle.

10. An arrangement as set forth in claim 9 wherein the transmission means comprises a belt type transmission.

11. An arrangement as set forth in claim 10 wherein the cooling means comprises a cooling shroud surrounding the belt and fan means driven by the transmission for cooling the transmission.

12. An arrangement as set forth in claim 11 wherein the means for transferring a portion of the heat extracted from the transmission means to the induction system comprises means for conveying the cooling air discharged from the cooling shroud into the induction system heating jacket.

* * * * *